United States Patent
Reinsch et al.

(10) Patent No.: US 7,055,559 B2
(45) Date of Patent: Jun. 6, 2006

(54) DISTRIBUTED CONTROL ARCHITECTURE FOR DISPENSING PARTICULATE MATERIAL INTO A FLUID MEDIUM

(75) Inventors: Frank G. Reinsch, Kansas City, MO (US); John A. Latting, Kearney, MO (US)

(73) Assignee: Rosen's, Inc., Fairmont, MN (US)

( * ) Notice: Subject to any disclaimer, the term of this patent is extended or adjusted under 35 U.S.C. 154(b) by 186 days.

(21) Appl. No.: 10/852,294

(22) Filed: May 24, 2004

(65) Prior Publication Data

US 2005/0102058 A1 May 12, 2005

Related U.S. Application Data

(60) Provisional application No. 60/473,376, filed on May 23, 2003.

(51) Int. Cl.
*B65B 1/04* (2006.01)
(52) U.S. Cl. ........................ 141/100; 141/192; 141/198
(58) Field of Classification Search .................... 141/9, 141/83, 100–104, 192, 198; 366/163.1, 163.2; 222/57, 63, 133, 143, 181.1
See application file for complete search history.

(56) References Cited

U.S. PATENT DOCUMENTS

| | | | |
|---|---|---|---|
| 3,697,052 A | 10/1972 | Andris | |
| 5,147,152 A * | 9/1992 | Link | 406/1 |
| 5,573,149 A | 11/1996 | Saito | |
| 5,803,673 A | 9/1998 | Reinsch et al. | |
| 6,120,175 A * | 9/2000 | Tewell | 366/140 |
| 6,425,529 B1 | 7/2002 | Reinsch et al. | |
| 6,763,860 B1 * | 7/2004 | Jungmann et al. | 141/104 |

OTHER PUBLICATIONS

Letter from F. Reinsch to T. Pekarek re delivery system, 1999.
Letter from F. Reinsch to J. Latting re ACCU-BIN™ system, 1999.
Flexicon Bulk Bag Dischargers, 2002, Flexicon Corporation.

* cited by examiner

*Primary Examiner*—Steven O. Douglas
(74) *Attorney, Agent, or Firm*—Fish & Richardson P.C.

(57) ABSTRACT

A system for controlling a networked array of dispensing devices for dispensing particulate matter may include local controllers connected to a parent controller. The parent controller may control an array of local controllers configured according to a network architecture. Each local controller may control one or more local dry chemical dispensing machines. In this way, the parent controller may control multiple dry chemical dispensing units over a network from a central location. In addition, the parent controller may directly control conventional liquid dispensers over the network. The parent and local controllers may be implemented using, for example, programmable logic controllers (PLCs).

12 Claims, 5 Drawing Sheets

DISTRIBUTED CONTROL ARCHITECTURE FOR DISPENSING PARTICULATE MATERIAL INTO A FLUID MEDIUM

CROSS-REFERENCE TO RELATED APPLICATION

The present application claims the benefit of the filing date of U.S. Provisional Application No. 60/473,376, entitled "Distributed Control Architecture and Improved Metering Apparatus and Methods for Agricultural Chemical Dispensers," which was filed on May 23, 2003, the contents of which are incorporated herein by reference.

BACKGROUND

Some agricultural chemicals and other such products are distributed in dry bulk form, either as powders, granules, or small pellets, but are ultimately dissolved into a liquid carrier for application by spraying or irrigation equipment. Other agricultural chemicals and other such products are distributed in liquid form. The practice of transporting chemical materials in dry form offers certain cost and space-saving advantages over transporting those chemicals in liquid form. In addition, government regulations regarding the transportation of chemical materials are generally more lenient if the material is shipped in dry form rather than liquid form.

A user of such agricultural chemicals may purchase the material in dry form, either in bags or bins, and may then mix the chemicals with water or another liquid carrier as needed. For example, the chemicals may be mixed with a liquid carrier immediately before applying the chemicals onto the targeted crops by pouring the dry chemicals and liquid carrier separately into a mixing tank. In another example, an empty tanker may be transported to a chemical distributor who, in turn, dispenses a pre-mixed solution into the tanker. The tanker containing the pre-mixed solution may then be transported to the targeted location for application by spraying or the like.

SUMMARY

A system for controlling a networked array of dispensing devices for dispensing particulate matter may include local controllers connected to a parent controller. The parent controller may control an array of local controllers configured according to a network architecture. Each local controller may control one or more local dry chemical dispensing machines. In this way, the parent controller may control multiple dry chemical dispensing units over a network from a central location. In addition, the parent controller may directly control conventional liquid dispensers over the network. The parent and local controllers may be implemented using, for example, programmable logic controllers (PLCs).

In an illustrative embodiment, each of a plurality of dry chemical inductors includes a bin for containing particulate matter, a conduit for transporting a stream of liquid carrier, and a valve for controllably releasing a quantity of particulate matter from the bin into the conduit. Each inductor may further include a sensor for measuring the quantity of particulate matter released from the bin, and a controller to receive signals from the sensor and actuate the valve to interrupt the flow of particulate matter when the desired amount of particulate matter has been released.

In one embodiment, a system for controlling a networked array of dispensing devices may include a first dispensing device. It may further include a second dispensing device for dispensing particulate matter. The second dispensing device may include a container for holding particulate matter. The second dispensing device may also include a conduit for transporting a stream of liquid carrier and for receiving particulate matter from the container. The second dispensing device may also include a sensor configured to monitor the amount of dry particulate matter dispensed and a local controller coupled to the sensor to generate a signal when a predetermined quantity of particulate matter is dispensed. In response to the generated signal, the flow of particulate matter into the conduit may be modified. In addition, the system may include a parent controller coupled to the first and second dispensing devices. The parent controller may transmit a first set of instructions to the second dispensing device. The local controller may generate a second set of instructions.

The first set of instructions may include instructions for directly controlling the operation of the first dispensing machine, or they may be selected from the group consisting of start, stop, and chemical select commands. The local controller may be configured to transmit status information to the parent controller. The local controller may also generate a signal in response to which the flow of particulate matter into the conduit is initiated, stopped, or throttled. The second set of instructions may include instructions for controlling the operation of the second dispensing machine.

In still other embodiments of the system, the parent controller may include a programmable logic controller (PLC) that calculates the quantity of particulate matter dispensed during an interval. The local controller may be wirelessly coupled to the sensor. In another embodiment, the second dispensing device may be adapted for dispensing controlled quantities of dry particulate matter selected from the group consisting of pesticides, herbicides, fertilizers, and adjuvants. The first dispensing device may be adapted for dispensing controlled quantities of material in liquid form. The sensor may be an electronic scale.

In yet another embodiment, a dispensing device for dispensing particulate matter includes a local controller. The local controller may be adapted to receive a first set of instructions for controlling the quantity of particulate matter dispensed by the dispensing device. The local controller may be further adapted to generate a second set of instructions for controlling the operation of the dispensing device.

In various other embodiments, the system may be modified to further include a sensor to generate a signal for indicating when a predetermined quantity of particulate matter is dispensed. The local controller may generate a signal in response to which the flow of particulate matter into the conduit is initiated, stopped, or throttled. The local controller may generate instructions to modify the flow of particulate matter into the conduit in response to the signal from the sensor.

Some embodiments may provide one or more advantages. For example, each networked dispensing device may be controlled from a convenient central location. As another example, the parent controller may control the dispensation of materials in both dry and liquid forms from a central location. As such, multiple dry and/or liquid dispensing devices can readily be controlled to simultaneously dispense controlled quantities of material of both forms. Accordingly, dispensing operations can be made more efficient and cost-effective.

The details of one or more embodiments are set forth in the accompanying drawings and the description below. Other features, objects, and advantages will be apparent from the description and drawings, and from the claims.

DESCRIPTION OF DRAWINGS

Like reference symbols in the various drawings indicate like elements.

DETAILED DESCRIPTION OF ILLUSTRATIVE EMBODIMENTS

Figure 1:
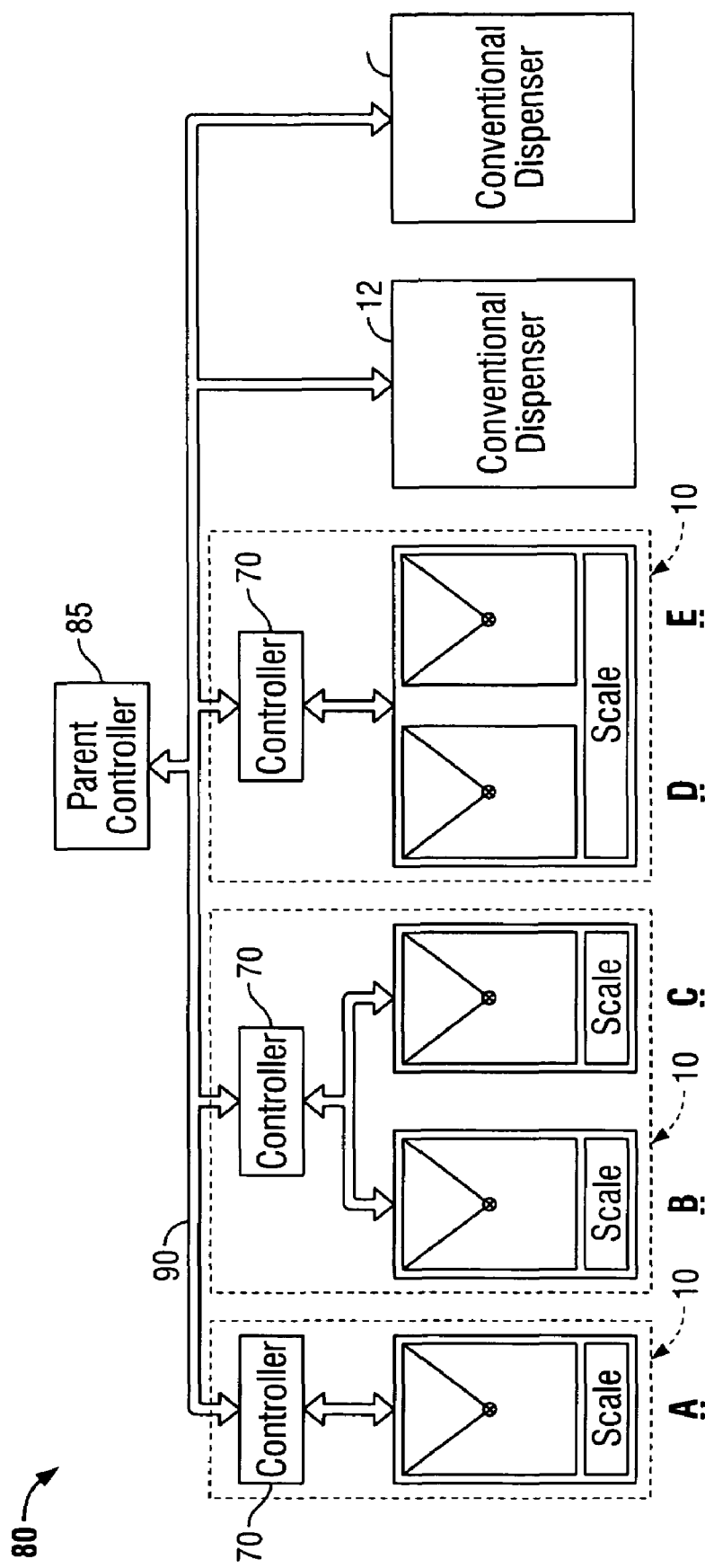
FIG. 1 is a schematic diagram of a network architecture for distributed control system for controlling an array of dispensing devices.

An exemplary distributed control network 80 that controls a networked array of dispensing devices is illustrated in FIG. 1. The distributed control network 80 includes an array of dispensing devices 10. In this example, the array of dispensing devices includes a number of dry particulate material dispensing devices 10, labeled as A–E. These dry material dispensing devices, which may also be referred to as chemical inductor units, are typically used to controllably dispense quantities of particulate material in dry form by mixing the dry material with a stream of liquid. The details of an exemplary device 10 are described at least in FIG. 4. The array of dispensing devices, in this example, also includes a number of conventional dispensing devices 12. These conventional dispensing devices are typically used to controllably dispense quantities of material in liquid form.

Each of the inductor units A–E is controlled by a local controller 70. Each local controller 70 provides monitoring and control functions over the operation of one or more of these inductors. The parent controller 85 communicates with each of the local controllers 70 in the distributed control network 80 over a network 90. As such, each local controller 70 operates under the supervisory control of the parent controller 85.

The exemplary distributed control network 80 of FIG. 1 may be advantageously deployed, for example, at a distribution center in which tankers are filled with multiple chemicals from multiple dispensing units. The inductor A is on a platform scale and is controlled by a local controller 70, which receives supervisory control instructions from the parent controller 85. The inductors B, C are on individual scales, but are controlled by a single local controller 70, which also receives supervisory instructions from the parent controller 85. The inductors D, E are weighed together on a single platform scale and are controlled by a single local controller 70, which receives supervisory control instructions from the parent controller 85. The three exemplary configurations of the local controller 70 illustrate the flexibility of a single local controller 70 to control a single inductor unit (A), two inductor units (B, C) with separate sensors, or two inductor units (D, E) with a single sensor. In this example, scales are used to determine the amounts of material dispensed.

In contrast to the control of the dry particulate material dispensing devices 10, some conventional liquid dispensers 12 do not require a dedicated local controller to control the dispensation of liquids. Accordingly, such dispensers may be controlled from a central control room via relatively simple instructions (e.g., open valve, close valve). Consequently, a number of liquid dispensers may readily be controlled by control signals from a central location without burdening the computing and communication resources of the parent controller 85. Thus, the two conventional dispensers 12, which may be used to dispense liquid herbicide, for example, may be directly controlled by the parent controller 85. In another example, stand-alone inductors adapted to dispense particulate ammonium sulfate based adjuvant and additional liquid herbicide dispensers 12 may all be connected to the network 90 and controlled by the parent controller 85 from, for example, a central control room.

Figure 2:
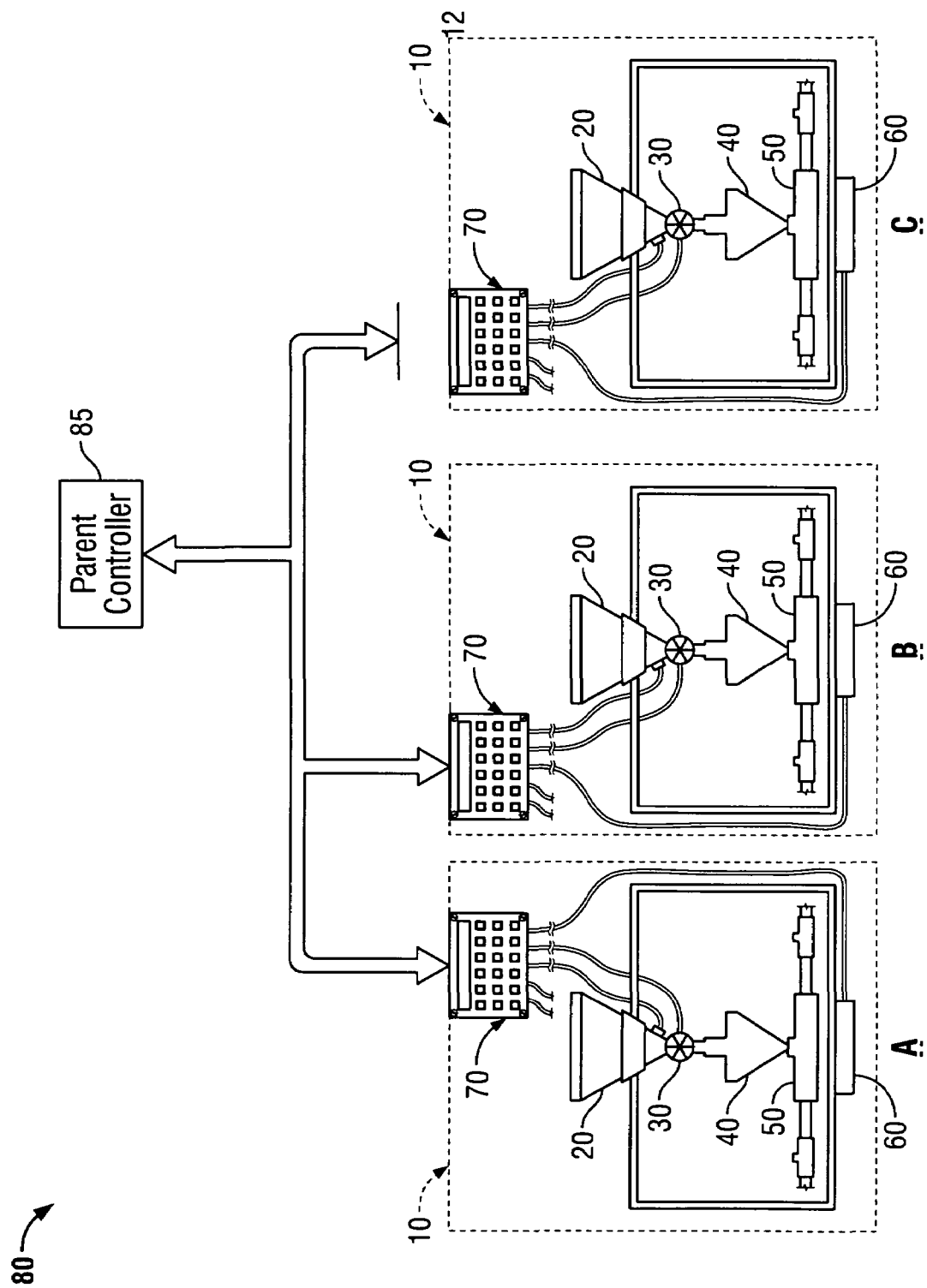
FIG. 2 is a system diagram of a portion an exemplary distributed control system.

An exemplary distributed control network 80 is illustrated in FIG. 2. In a portion of the distributed control network 80, chemical inductors 10 (A, B, C) may be operated using the distributed control network 80. The local controller unit 70 of each chemical inductor 10 is connected to the parent controller 85 via the network 90. In this example, the control units 70 for chemical inductors A, B are connected to the parent controller 85, while inductor C operates independently from the parent controller 85. In some examples, the inductors A, B, and C may contain different dry particulate matter in their respective bins 20. A rotor 30 controllably releases the particulate matter contained each bin 20 into a chamber 40. The chamber 40 is designed to funnel the particulate matter into a conduit 50. A stream of a liquid carrier medium flows through the conduit 50 and causes the particulate matter to be dispensed downstream. While chemical inductors A and B release particulate matter from their respective bins 20, they dispense a chemical solution. During this process, operational data and other information may be communicated to the parent controller 85. Such information may also be periodically transferred to the parent controller 85 after being stored in the memory of the local controller 70.

In some examples, a chemical inductor 10 may be used to release particulate matter from its bin 20 and dispense a chemical solution. After each use, or after a certain amount of time, inductor 10 may be temporarily connected to the parent controller 85 to periodically exchange operational data and other information. An operator of the distributed control network 80 may use the parent controller 85 to monitor amounts of the chemicals dispensed from the chemical inductors 10, manage inventory and re-supply shipments, and issue invoices based upon the monitored usage or other metrics.

In certain embodiments, the control lines between the parent controller 85 and the individual control units 70 include a system status line, start/stop line, sensor line, and a DC supply voltage line. The sensor line may transmit to the parent controller 85 raw data from the sensing devices 60. Alternatively, the sensor line may transmit values that represent calculated estimates of, for example, the quantity of material dispensed by the chemical inductor 10. In an illustrative embodiment, the sensor line may be used to transmit a signal when a given mass, weight or volume of material (e.g. one pound) has been dispensed. Alternately, the local controller may transmit to the parent controller a signal indicating the mass, weight, or volume of material dispensed on a regular time interval, such as every 0.1 second. Accordingly, the parent controller can monitor the sensor line and generate a stop signal when the desired amount of material has been dispensed.

The same or additional sensor lines or bus(es) can be used to transmit signals associated with signals received from other sensors, such as load cell(s) coupled to the bin, Hall effect sensors coupled to the rotor, etc. Accordingly, the local controller can transmit signals indicative of the number of rotor rotations, a volume calculated from the number of auger rotations, a change in weight indicated by the load cells, or other signals indicative of the status or progress of the dispensation.

In addition to having one or more sensor lines, certain embodiments include one or more control lines. Control lines may transmit, for example, chemical selection information, password/access control information, and the like. In some embodiments, the parent controller 85 may be connected directly to other devices (e.g., conduit valves, pump, rotor, gravimetric sensing device, flow meter, etc.) on the individual chemical inductors 10. For example, the parent controller 85 may provide and receive control signals similar to those described below in connection with FIG. 3.

Figure 3:
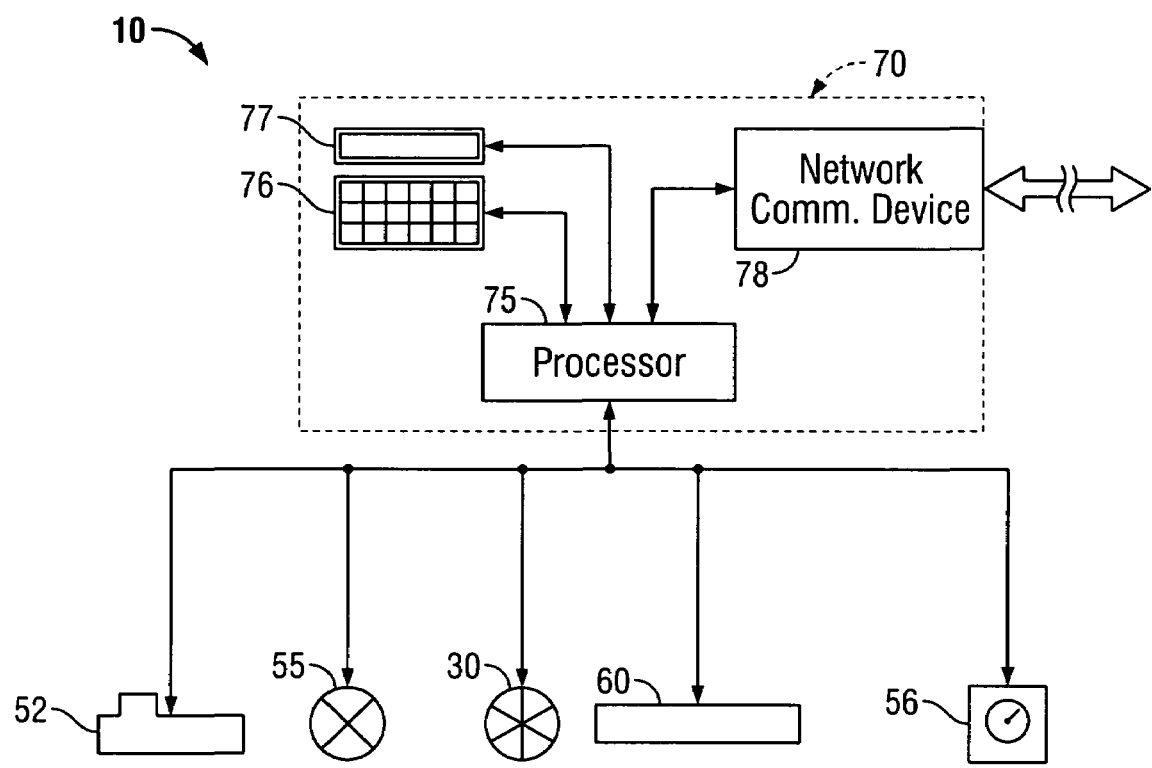
FIG. 3 is a schematic diagram of a local controller that may be used in the distributed control system of FIGS. 1–2.

A local controller 70 operably connected to control the dispensing operation controls each chemical inductor 10 of FIGS. 1 and 2. One exemplary configuration of a local controller 70 configured to control various aspects of the operation of a chemical inductor 10 is illustrated in FIG. 3. In this example, the controller 70 includes a local processor 75, a user interface device 76, a display 77, and a network communication device 78. The processor 75 may be specifically adapted for use with the controller 70 and inductor 10. In some embodiments, a specially configured personal computing system may serve as the controller 70. The user interface device 76 permits a local user of the chemical inductor 10 to input data (e.g., authorization password, material properties, desired concentration of the solution, and the like). The interface 76 may be embodied as a keypad, touch screen, mouse, or other similar device. Depending on the complexity of the controller 70, the display 77 may be an alphanumeric display device to show the operational status of the chemical inductor 10 and to facilitate interaction between the local user and the controller 70. The network communication device 78 may be embodied as a modem, a network controller coupled to a LAN, WAN, WiFi, an IP portal, or other electronic communication means. Using the network communication device 78, the processor 75 may be configured to request and receive firmware or software updates, upload or download operational data, instructions, commands, and the like. For example, the processor 75 may communicate with the parent controller 85 using the network 90 (FIG. 1). The communication between the local controller 70 and the parent controller 85 may include transmitting and receiving operational data that includes system status information, fault information, and information indicating the amount and type of chemical dispensed from the inductor 10.

The exemplary local controller 70 is configured to control conduit valves 52 or pump 55, a rotor 30, and other devices involved in the release of particulate matter from the bin 20 and the flow of the liquid carrier medium through the conduit 50. In addition, the controller 70 is connected to various sensing devices, such as, for example, a gravimetric sensing device 60, to indicate the amount of particulate matter released from the bin 20, and a flow meter 56 to indicate the flow rate of the liquid carrier medium through the conduit 50. The control lines between the controller 70 and the devices may transmit start/stop signals, status signals, DC current, transducer I/O, and the like.

Figure 4:
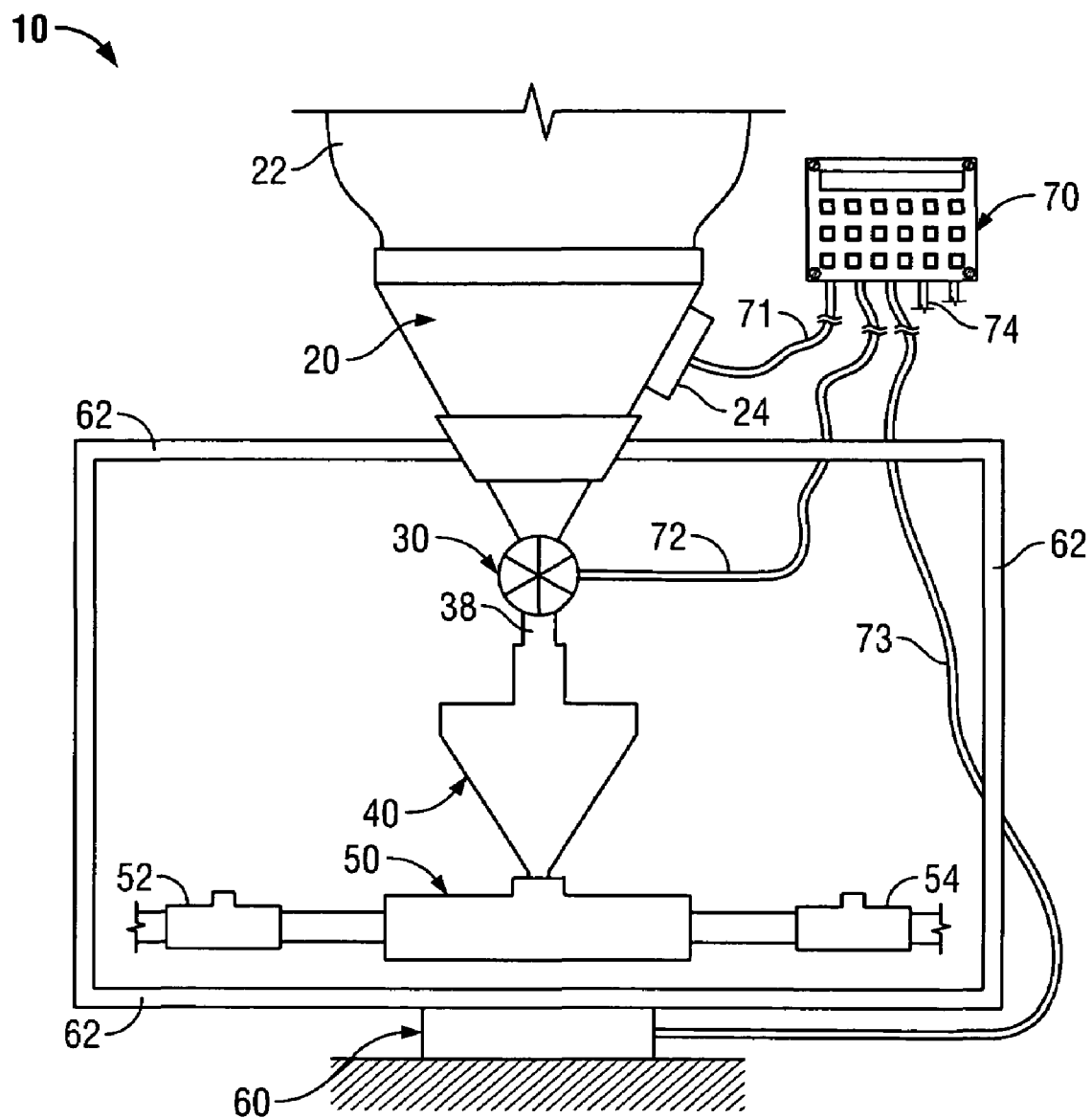
FIG. 4 is a cross-section view of a dispensing device controlled by the local control system of FIG. 3.

A local controller 70 in accordance with the foregoing description of FIG. 3 may be connected to control the operation of an exemplary chemical inductor 10, as shown in FIG. 4. In this example, the chemical inductor 10 functions as a weight-based particulate matter dispensing device. The chemical inductor 10 includes a bin 20 adapted to contain dry particulate matter, such as chemical powder, granular material, or pelletized material that is not suspended in a liquid medium. A rotor valve includes a rotor 30 is connected to the lower portion of the bin 20 so that the particulate matter is funneled through the bin 20 and into the rotor 30. In the embodiment shown in FIG. 4, the rotor 30 includes multiple vanes that rotate in a housing to dispense the particulate matter from the bin 20. It will be understood, however, that any suitable rotor can be used, including drum rotors, vane rotors, swing-bucket rotors, fixed-angle rotors, V-rotors, auger rotors, cantilevered rotors, or balancing rotors. The rotor 30 controllably releases the particulate matter from the bin 20 into a chamber 40, which is designed to funnel the particulate matter into a conduit 50. A liquid carrier medium flows through the conduit 50. In this example, sensing device 60 (e.g., an electronic scale) is mechanically coupled to the bin 20 via a frame 62 such that the sensing device 60 may measure the gravimetric amount (e.g., weight or mass) of particulate matter that is released from the bin 20. The gravimetric sensing device 60 transmits signals via a conductor 73 to the local controller 70. Based at least in part on these signals, the local controller 70 controls the flow of particulate matter through the rotor 30 and the flow of liquid carrier through the conduit 50. The controller 70 processes the data from the gravimetric sensing device 60, and when the desired gravimetric amount of particulate matter is released from the bin 20, the controller 70 signals the rotor 30 to cease the flow of particulate matter.

The particulate matter may be fed into the bin 20 using a bag 22 or other container. In some examples, each dispenser includes a chamber 40 that is coupled to two rotors 30 that are each coupled to a different bin 20. Accordingly, upon receipt the appropriate control signals the dispenser will dispense dry particulate matter from one or both bins through the associated rotors and chambers.

In the embodiment shown in FIG. 4, a vibratory device 24 is mechanically coupled to the bin 20 to facilitate the flow of particulate matter down through the bin 20 and into the rotor 30. The vibratory device 24 is electrically connected to the controller 70 via interconnect 71, and similarly, the rotor 30 is connected to the controller 70 via a interconnect 72. As such, the controller 70 may, for example, activate the vibratory device 24 while activating the rotor 30 to release particulate matter from the bin 20. The particulate matter flows through the rotor 30 and exits through a dispensing tube 38 into the chamber 40. In this embodiment, the dispensing tube 38 is slidably engaged with the chamber 40 such that the bin 20, rotor 30, and dispensing tube 38 may vertically shift (depending on the load of particulate matter in the bin 20) with little or no vertical support from the chamber 40. Consequently, the load of particulate matter in the bin 20 is substantially transmitted to the gravimetric sensing device 60, which is mechanically coupled to the bin 20 via the frame 62.

In this example, the gravimetric sensing device 60 is an electronic scale connected to the controller 70 via interconnect 73. Using interconnect 73, the controller 70 receives a signal from the sensing device 60 indicative of the weight or mass of particulate matter released from the bin 20. However, alternative methods may be used to monitor and control the operation of the dispensation using the chemical inductor 10. For example, the amount of material dispensed may be determined according to the length of time the rotor 30 is operated, or determined on the number of rotations of the auger. In another example, the speed of the rotor 30 may be controlled or monitored to determine the quantity of material dispensed. In another example, the local controller 70 may send a signal or series of signals to the parent controller 85.

The signal may be indicative of the amount of material dispensed, in which case the parent controller 85 may, upon receipt of a signal indicating that a predetermine amount of material has been dispensed, send a command to the local controller 70 to cease dispensing.

Optionally, the parent and/or local controllers may compensate for the latency introduced by various elements of the distributed control network 80 and/or the various elements in each inductor 10. During the time delay between generation of a signal by the local controller indicating that the preselected amount of particulate matters has been dispensed and the actuation of the inductor elements in response to a stop command from the parent controller, significant amounts of particulate material may be dispensed. This latency may be compensated for by, for example, having the parent controller 85 generate a stop signal in response to a signal from the local controller indicating that the inductor has dispensed an amount of material corresponding to the preselected amount minus the amount of material which is predicted to be dispensed during the latency. In such an embodiment, the parent controller generates a stop signal shortly before the inductor has actually dispensed the desired amount of material.

After the particulate matter is released from the bin 20 and enters the chamber 40, the particulate matter is funneled into the conduit 50 for mixing with a liquid carrier. The liquid carrier may be forced through the conduit 50 using a high-pressure pump (not shown). In certain embodiments, it is advantageous to force the liquid carrier medium through the conduit 50 only at designated times (e.g., only when particulate matter is released from the bin 20 for mixing), so conduit valves 52 and 54 may be used to restrict the flow of the liquid carrier medium. In this example, the conduit valves 52 and 54 are ball valves that are controlled by the controller 70. Thus, the controller 70 causes the ball valves 52 and 54 open the flow of liquid carrier medium through the conduit 50 when the particulate matter is to be mixed and causes the ball valves 52 and 54 to cease the flow through the conduit 50 at the appropriate times.

The function of the rotor 30 may be achieved using a manually actuated valve, such as a trunnion ball valve, a butterfly valve, a knife gate valve, and the like. The parent controller 85 (FIG. 1) may provide a predetermined set point to the local controller 70 over the network 90. This predetermined set point may determine, for example, the amount of material that the chemical inductor 10 is to dispense, i.e., a batch amount. In some examples, the local controller 70 or the parent controller 85 may activate a speaker to provide a distinct audible tone to notify an operator that the desired quantity of material has been dispensed. Alternatively, other types of indicators may be used, such as LEDs, lamps, or other types of status information that may be displayed on a computer terminal.

In some embodiments, the conduit 50 may include an eductor (not shown) to facilitate the mixing of the particulate matter and the liquid carrier medium. The eductor exposes the flowing stream of liquid carrier medium to the particulate matter dispensed from the chamber 40. Moreover, when the flow rate of the liquid carrier medium reaches a certain level, a vacuum effect is achieved and the particulate matter is drawn toward the stream of liquid carrier medium for mixing. In some embodiments, this vacuum effect may be used to open a check valve in the chamber 40 and permit the particulate matter to flow from the chamber 40.

Figure 5:
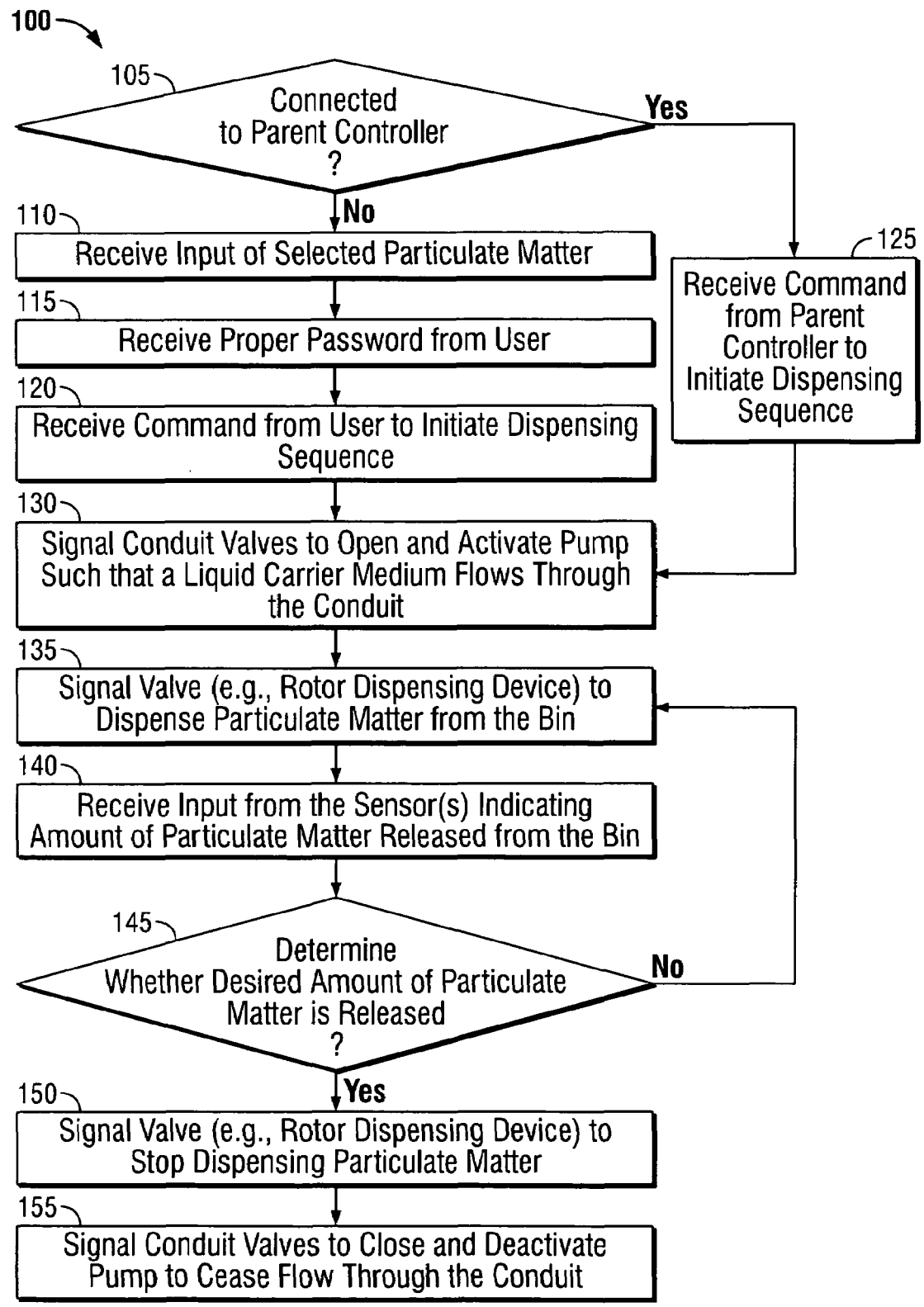
FIG. 5 is flow chart of the control process for the local controller of FIG. 3.

Each local controller 70 in the distributed network controller architecture operates to dispense material from a chemical inductor 10 according to supervisory instructions from the parent controller 85. FIG. 5 is a flow chart that depicts an exemplary method 100 that may be executed by the parent controller 85 and one or more local controllers 70 in the distributed control network 80. When the chemical inductor 10 is idle (e.g., not mixing or dispensing a chemical solution), the conduit valves 52 are closed to prevent flow through the conduit 50, and the rotor 30 is closed to prevent flow of particulate matter from the bin 20. The first step 105 in the process flow 100 of the controller 70 is to determine whether the chemical inductor 10 is under the control of the parent controller 85. If the chemical inductor 10 is disconnected from the network 90 (FIG. 1), the parent controller 85 does not control the chemical inductor 10, and the process 100 continues to the local activation steps 110, 115, and 120. Alternatively, the chemical inductor 10 may be connected to the network 90, but the parent controller 85 may permit a user to locally activate the chemical inductor 10 using the controller 70, in which case the process 100 may continue to steps 110, 115, and 120.

In step 110, the chemical inductor 10 may be locally activated when the controller 70 receives input concerning the particulate matter to be dispensed (e.g., type of chemical, desired concentration of the solution, weight of particulate matter to be released from the bin 20, or the like). The local activation may be blocked by password protection at 115, in which case the controller 70 must receive the proper password via the user interface device 76 (FIG. 3). After the proper information and password is input, the controller 70 may receive a signal from the user (e.g., by pressing a "start" button) to initiate the dispensing sequence at 120.

Still referring to FIG. 5, chemical inductors 10 that are connected to the network 90 may be activated by the parent controller 85. For example, if the controller 70 determines that the inductor 10 is under the control of the parent controller 85 at 105, the controller 70 awaits a signal from the parent controller 85 to initiate the dispensing sequence at step 125. In some embodiments, the operator of the distributed control network 80 (FIG. 1) may input information concerning the particulate matter to be dispensed (e.g., type of chemical, desired concentration of the solution, weight of particulate matter to be released from the bin 20, or the like). The parent controller 85 may relay this information to the controller 70 along with a command to initiate the dispensing sequence.

Upon completion of either step 120 or step 125, the controller 70 causes the conduit valves 52 to open and activates the pump 55 such that the liquid carrier medium flows through the conduit 50 at step 130. Then, the controller 70 causes the rotor 30 to release particulate matter from the bin 20 at 135. In some embodiments, the rotor 30 is activated to release particulate matter from the bin 20 only after the flow rate of liquid carrier medium through the conduit 50 reaches a certain level so as to open the check valve 44. While the controller 70 causes the rotor 30 to release particulate matter from the bin 20, the control unit receives signals from one or more sensing devices indicative of the weight or mass of particulate matter released from the bin 20 at 140. Upon receiving such signals, the controller 70 determines whether the desired amount of particulate matter has been released from the bin 20 at 145. If an insufficient amount of particulate matter has been released, the controller 70 causes the rotor 30 to continue releasing particulate matter at 135. When the desired amount of particulate matter has been released, the controller 70 causes the rotor 30 to stop the flow of particulate matter at 150. The controller 70 then closes the conduit valves 52 and deactivates the pump to cease flow of the liquid carrier medium through the conduit 50 at 155. The chemical inductor 10 then returns to an idle status and awaits further commands from a user or from the parent controller 85. In one embodiment, some of the control signals may be generated under the supervision of the parent controller 85. In one example, at the completion of a timeout period, the local controller 70 outputs a signal indicative of a standby, or "system off," state.

In some examples, the latency introduced by various elements of the distributed control network 80 and/or the various elements in each inductor 10, may reduce the accurate dispensation of controlled amounts of particulate matter. These latencies may be compensated for by, for example, having the parent 85 or the local controller 70 generate the control signals that command the inductor 10 to cease dispensing material shortly before or after the signals are received that desired amount of particulate matter has been released.

In some embodiments, the parent controller 85 may communicate with the local controllers 70 in real-time. In some examples, the network 90 may be configured as a ring or a daisy chain. In wired applications, the network interfaces may use, for example, RS-232, RS-422, RS-485, or ethernet. The network 90 may use commercially available industrial networking architectures, such as DeviceNet, ModBus, or DH+, for example. In one embodiment, the local controller 70 may communicate with the parent controller using a protocol such as TCP/IP.

In various embodiments, the network 90 may be configured to operate wirelessly. In one embodiment, the parent controller 85 may communicate with some local controllers 70 wirelessly using, for example, a wireless network router that uses a wireless protocol such as 802.1lb. In other embodiments, the network 90 may include interconnections that use, for example fiber optic links. The use of wireless methods for the network 90 may offer advantages in some embodiments. For example, the installation of a wireless system does not require the installation of wired interconnections (i.e. cables) that run from the parent controller 85 to the local controllers 70. This may reduce electric and magnetic field coupling (i.e. electromagnetic interference) that could corrupt data and control signals. Moreover, the hardware interface between the network 90 and the networked controllers 70, 85 may be simplified. In addition, the devices connected to the network 90 may be more easily moved, for example, to different locations in a distribution plant. Being wirelessly networked may facilitate, for example, dual-use of an inductor 10 in both a stand-alone operation at one location and in networked operation at another location.

In yet another example, one or more of the controlled components or sensing devices (e.g., conduit valves 52, pump 55, rotor 30, gravimetric sensing device 60, flow meter 56, etc.) may communicate with the local processor 75 (FIG. 3) using infrared transmitters/receivers, RF transmitters/receivers, or other wireless networking means.

In another embodiment, the inductor 10 may operate without a complex controller 70. Rather, a local controller may be housed within, for example, the gravimetric sensing device 60 and electrically coupled to the rotor 30. For example, the gravimetric sensing device 60 may comprise an electronic scale having a self-calibrating controller housed inside the scale such that the controller may "zero" the electronic scale before each use of the inductor 10. When the electronic scale signaled that the desired amount of particulate matter was released, the controller could transmit a signal directly to the rotor 30, which may comprise a solenoid valve, to cease the flow of particulate matter.

In yet other embodiments, the conduit carries a gaseous fluid. In such embodiments, a high-pressure pump may be used to propel ambient air through a suitable eductor such as an expansion valve. Particulate or liquid herbicide, adjuvant, fertilizer, or the like may be dispensed into the air stream via one or more of the techniques described above.

A number of embodiments have been described. Nevertheless, it will be understood that various modifications may be made without departing from the spirit and scope of the invention. Accordingly, other embodiments are within the scope of the following claims.

What is claimed is:

1. A system comprising:

a first dispensing device;

a second dispensing device for dispensing particulate matter, the second dispensing device comprising:

a container for holding particulate matter;

a conduit to transport a stream of liquid carrier and to receive particulate matter from the container;

a sensor to monitor the amount of dry particulate matter dispensed; and a local controller coupled to the sensor to generate a signal when a predetermined quantity of particulate matter is dispensed and to modify the flow of particulate matter into the conduit in response to said signal; and a parent controller coupled to the first and second dispensing devices, wherein the parent controller transmits to the second dispensing device remote signals associated with a first set of dispensing device operations and the local controller generates local signals associated with a second set of dispensing device operations.

2. The system of claim 1, further comprising a third dispensing device for dispensing dry particulate matter, the third dispensing device comprising:

a container for holding particulate matter;

a conduit to transport a stream of liquid carrier and to receive particulate matter from the container of the third dispensing device;

a sensor to monitor the amount of dry particulate matter dispensed from the third dispensing device; and a local controller coupled to the sensor to generate a signal when a predetermined quantity of particulate matter is dispensed in response to which the flow of particulate matter into the conduit of the third dispensing device is modified, wherein the parent controller is coupled to the third dispensing device to transmit to the third dispensing device remote signals associated with a third set of dispensing device operations, and wherein the local controller of the third dispensing device generates local signals associated with a fourth set of dispensing device operations.

3. The system of claim 1, wherein the parent controller transmits remote signals to the first dispensing device for directly controlling one or more operations of the first dispensing machine.

4. The system of claim 1, wherein the first set of dispensing device operations comprises one or more operations selected from the group consisting of start, stop, and chemical select.

5. The system of claim 1, wherein the local controller transmits status information to the parent controller.

6. The system of claim 1, wherein the local controller generates a signal in response to which the flow of particulate matter into the conduit is initiated, stopped, or throttled.

7. The system of claim 1, wherein the parent controller comprises a programmable logic controller (PLC), wherein the PLC calculates the quantity of particulate matter dispensed during a time interval.

8. The system of claim 1, wherein the local controller is wirelessly coupled to the sensor.

9. The system of claim 1, wherein the second dispensing device is adapted for dispensing controlled quantities of dry particulate matter selected from the group consisting of pesticides, herbicides, fertilizers, and adjuvants.

10. The system of claim 9, wherein the first dispensing device is for dispensing material in liquid form.

11. The system of claim 1, wherein the sensor comprises an electronic scale.

12. The system of claim 2, wherein the second set of dispensing device operations and the fourth set of dispensing device operations each comprise operations to modify the flow of particulate matter.

* * * * *